US009978519B2

(12) United States Patent
Omori et al.

(10) Patent No.: US 9,978,519 B2
(45) Date of Patent: May 22, 2018

(54) MULTILAYER CERAMIC ELECTRONIC COMPONENT

(71) Applicant: Murata Manufacturing Co., Ltd., Nagaokakyo-shi, Kyoto-fu (JP)

(72) Inventors: Takashi Omori, Nagaokakyo (JP); Seiji Koga, Nagaokakyo (JP); Jun Ikeda, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days. days.

(21) Appl. No.: 15/071,646

(22) Filed: Mar. 16, 2016

(65) Prior Publication Data

US 2016/0196922 A1    Jul. 7, 2016

Related U.S. Application Data

(63) Continuation of application No. PCT/JP2014/070511, filed on Aug. 4, 2014.

(30) Foreign Application Priority Data

Sep. 24, 2013    (JP) ................................. 2013-196984

(51) Int. Cl.
  *H01G 4/228*    (2006.01)
  *H01G 4/30*    (2006.01)
  (Continued)

(52) U.S. Cl.
  CPC ............... *H01G 4/30* (2013.01); *H01G 4/008* (2013.01); *H01G 4/0085* (2013.01); *H01G 4/12* (2013.01);
  (Continued)

(58) Field of Classification Search
  CPC ............................. H01G 4/228; H01G 4/232
  See application file for complete search history.

(56) References Cited

U.S. PATENT DOCUMENTS 5,883,780 A    3/1999    Noji et al.
8,102,641 B2    1/2012    Koga
    (Continued)

FOREIGN PATENT DOCUMENTS

JP    05003132 A    *    1/1993
JP    05144660 A    *    6/1993
    (Continued)

OTHER PUBLICATIONS

Japanese Office Action dated Jun. 21, 2016 and issued for counterpart application JP 2015-539002 (English translation attached hereto).
    (Continued)

*Primary Examiner* — Eric Thomas
(74) *Attorney, Agent, or Firm* — Arent Fox LLP

(57) ABSTRACT

A multilayer ceramic electronic component includes a ceramic body having an end surface and a side surface adjacent to thereto such that the end surface and the side surface meet at an edge. The ceramic body has a plurality of internal electrodes with adjacent pairs of the internal electrodes being separated by a respective ceramic layer. An external electrode containing a metal, an inorganic component and voids is electrically connected to at least some of the internal electrodes and both covers the end surface and extends over the edge onto the side surface to form an extending-around portion which extends at least 50 μm onto the side surface as measured in a direction perpendicular to the edge and ends at a leading edge remote from the edge. A portion of the extending-around area which extends 50 μm from the leading edge towards the edge has an average occupancy area ratio which is at least 25 but not greater than 75. The occupancy area ratio is the ratio between the area of the conductive component and an area of the inorganic component on the one hand to the area of the conductive
    (Continued)

component, the area of the inorganic component and the area of the voids on the other.

5 Claims, 4 Drawing Sheets

(51) Int. Cl.
    *H01G 4/232* (2006.01)
    *H01G 4/008* (2006.01)
    *H01G 4/12* (2006.01)
    *H01G 4/248* (2006.01)

(52) U.S. Cl.
    CPC ........... *H01G 4/1227* (2013.01); *H01G 4/232* (2013.01); *H01G 4/2325* (2013.01); *H01G 4/248* (2013.01)

(56) References Cited

U.S. PATENT DOCUMENTS

| | | | |
|---|---|---|---|
| 2010/0067170 A1 | 3/2010 | Koga | |
| 2013/0182369 A1 | 7/2013 | Jeon et al. | |
| 2014/0240895 A1* | 8/2014 | Lee | H01G 4/12 361/301.4 |

FOREIGN PATENT DOCUMENTS

| | | | |
|---|---|---|---|
| JP | H08162369 A | | 6/1996 |
| JP | H0955118 A | | 2/1997 |
| JP | H1022163 A | | 1/1998 |
| JP | 2001260740 A | | 9/2001 |
| JP | 2005050895 A | | 2/2005 |
| JP | 2006013219 A | | 1/2006 |
| JP | 2006186316 A | | 7/2006 |
| JP | 2012033621 A | | 2/2012 |
| JP | 2012079862 A | | 4/2012 |
| JP | 2012151175 A | * | 8/2012 |
| JP | 2013149936 A | | 8/2013 |
| KR | 20100032341 A | | 3/2010 |

OTHER PUBLICATIONS

International Search Report issued for PCT/JP2014/070511, dated Nov. 4, 2014.
Written Opinion of the International Searching Authority issued for PCT/JP2014/070511, dated Nov. 4, 2014.

* cited by examiner

MULTILAYER CERAMIC ELECTRONIC COMPONENT

CROSS REFERENCE

The present application is a continuation of International application No. PCT/JP2014/070511, filed Aug. 4, 2014, which claims priority to Japanese Patent Application No. 2013-196984, filed Sep. 24, 2013, the entire contents of each of which are incorporated herein by reference.

TECHNICAL FIELD

The present invention relates to a multilayer ceramic electronic component, and more specifically to a multilayer ceramic electronic component including a ceramic body having a structure in which internal electrodes are stacked in layers with a ceramic layer interposed therebetween, and an external electrode arranged to extend around from an end surface to a side surface of the ceramic body.

BACKGROUND ART

One representative ceramic electronic component is, for example, a multilayer ceramic capacitor having a structure as shown in FIG. 5.

As shown in FIG. 5, this multilayer ceramic capacitor has a structure including a stack of ceramic layers (ceramic body) 60 in which a plurality of internal electrodes 52 (52a, 52b) are stacked in layers with a ceramic layer 51 as a dielectric layer interposed there between, and external electrodes 54 (54a, 54b) arranged on opposite end surfaces 53a, 53b of ceramic body 60 which are electrically connected to internal electrodes 52 (52a, 52b).

Note that each of external electrodes 54 (54a, 54b) often has a structure in which a Ni-plating film layer is formed over a surface of an external electrode main body made of Cu, for example, and a Sn-plating film layer is additionally formed over a surface of the Ni-plating film layer.

In manufacturing this multilayer ceramic capacitor, external electrodes 54 (54a, 54b) are generally formed using a method in which a conductive paste is applied to the opposite end surfaces of the stack of ceramic layers (ceramic body), and then fired.

As such a conductive paste for use in forming the external electrodes, a conductive paste (conductor paste) has been proposed in which glass frit and at least one or more conductive materials selected from Ag, Au, Cu, Ni, Pd, and Pt, for example, are dispersed in a vehicle, wherein the glass frit, calculated as oxides, is composed of SrO: 40.0 to 70.0 wt %; B2O3: 15.0 to 30.0 wt %; Al2O3: 10.0 to 20.0 wt %; SiO2: 3.0 to 20.0 wt %; and MnO: 0 to 20.0 wt % (see Japanese Patent Laying-Open No. 9-55118).

Japanese Patent Laying-Open No. 9-55118 also discloses a multilayer ceramic capacitor including external electrodes formed with the above-described conductive paste.

Furthermore, Japanese Patent Laying-Open No. 9-55118 describes that the use of the above-described conductive paste allows the formation of external electrodes having excellent tensile strength and bending strength, leading to a multilayer ceramic capacitor having high mounting reliability.

In the conductive paste according to Japanese Patent Laying-Open No. 9-55118, the bending strength of the external electrodes is improved by defining the glass frit to control the coefficient of linear expansion in the glass phase and the reaction phase after baking, thereby reducing a residual stress caused by the resulting external electrodes.

Indeed, in order to enhance mechanical properties of the multilayer ceramic capacitor, it would be effective to define the glass frit for use in the conductive paste used for forming the external electrodes, so as to control the coefficient of linear expansion in the glass phase and the reaction phase after baking.

However, the stress caused by the external electrodes cannot necessarily be sufficiently reduced by merely controlling the coefficient of linear expansion in the glass phase and the reaction phase, and therefore, there is room for improvement under such circumstances.

SUMMARY OF INVENTION

The present invention has been made to solve the aforementioned problem, and aims to provide a highly-reliable multilayer ceramic electronic component having a reduced residual stress caused by the external electrodes, and exhibiting excellent mechanical strength.

To solve the aforementioned problem, a multilayer ceramic electronic component according to the present invention includes:

a ceramic body having an end surface and a side surface adjacent to thereto, the end surface and the side surface meeting at an edge, the ceramic body having a plurality of internal electrodes, adjacent pairs of internal electrodes being separated by a respective ceramic layer; and an external electrode containing a metal, an inorganic component and voids, the external electrode being electrically connected to at least some of the internal electrodes, covering the end surface and extending over the edge onto the side surface to form an extending-around portion which extends at least 50 µm onto the side surface as measured in a direction perpendicular to the edge and ends at a leading edge remote from the edge, a portion of the extending-around area which extends 50 µm from the leading edge towards the edge having an average occupancy area ratio which is at least 25 but not greater than 75.

The occupancy area ratio is defined as the ratio between the area of the conductive component and the area of the inorganic component on the one hand and the area of the conductive component, the area of the inorganic component and the area of the voids on the other.

The manner in which these values are measured are described in further detail below.

In the multilayer ceramic electronic component according to the invention, preferably, the extending-around portion of the external electrode extending around to the side surface of the ceramic body has a thickness from 5 to 10 µm.

By forming the thickness of the extending-around portion of the external electrode between 5 to 10 µm, a highly-reliable multilayer ceramic electronic component having a reduced residual stress caused by the external electrode and exhibiting excellent mechanical strength can be more reliably provided.

In the multilayer ceramic electronic component according to the invention, the conductive component forming the external electrode preferably contains Cu as a main component.

When the conductive component forming the external electrode contains Cu as the main component, through application of the present invention, a highly-reliable multilayer ceramic electronic component having a reduced residual stress caused by the external electrode and exhibiting excellent mechanical strength can be reliably provided.

In the multilayer ceramic electronic component according to the invention, the inorganic component forming the external electrode preferably contains Si.

When the inorganic component forming the external electrode contains Si, through application of the present invention, a highly-reliable multilayer ceramic electronic component having a reduced residual stress caused by the external electrode and exhibiting excellent mechanical strength can be provided reliably.

In the multilayer ceramic electronic component according to the present invention having the structure as described above, the external electrode contains a metal as the conductive component and an inorganic component other than the conductive component, and the occupancy area ratio of the conductive component and the inorganic component is from 25 to 75, the occupancy area ratio (%) of the conductive component and the inorganic component being defined by the following equation:

Occupancy area ratio=(the area of the conductive component+the area of the inorganic component)/(the area of the conductive component+the area of the inorganic component+the area of the void)×100. (Equation 1)

The area of the conductive component, the area of the inorganic component, and the area of the voids is determined by observation using scanning ion microscope (SIM) images of three cross sections of the edge region as described in further detail below. In this way, a highly-reliable multilayer ceramic electronic component having a reduced residual stress caused by the external electrode and exhibiting excellent mechanical strength such as bending strength can be provided.

This can be attributed to the fact that when the occupancy area ratio of the conductive component and the inorganic component is from 25 to 75%, the stress caused by the metal as the conductive component is lessened, leading to an effect of improving the mechanical strength.

In particular, the stress tends to increase in the edge region, which is the region within 50 μm from the leading edge of the extending-around portion of the external electrode extending around to the side surface of the ceramic body, and thus, a crack or the like tends to originate from this region. The improvement in mechanical strength is believed to be greatly attributed to the fact that the occupancy area ratio of the conductive component and the inorganic component in this edge region is within the above-defined range.

DESCRIPTION OF EMBODIMENTS

Figure 1:
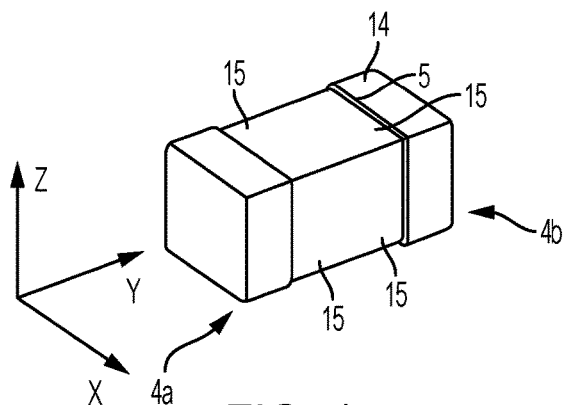
FIG. 1 is a perspective view of a multilayer capacitor according to an embodiment of the present invention.
Figure 2:
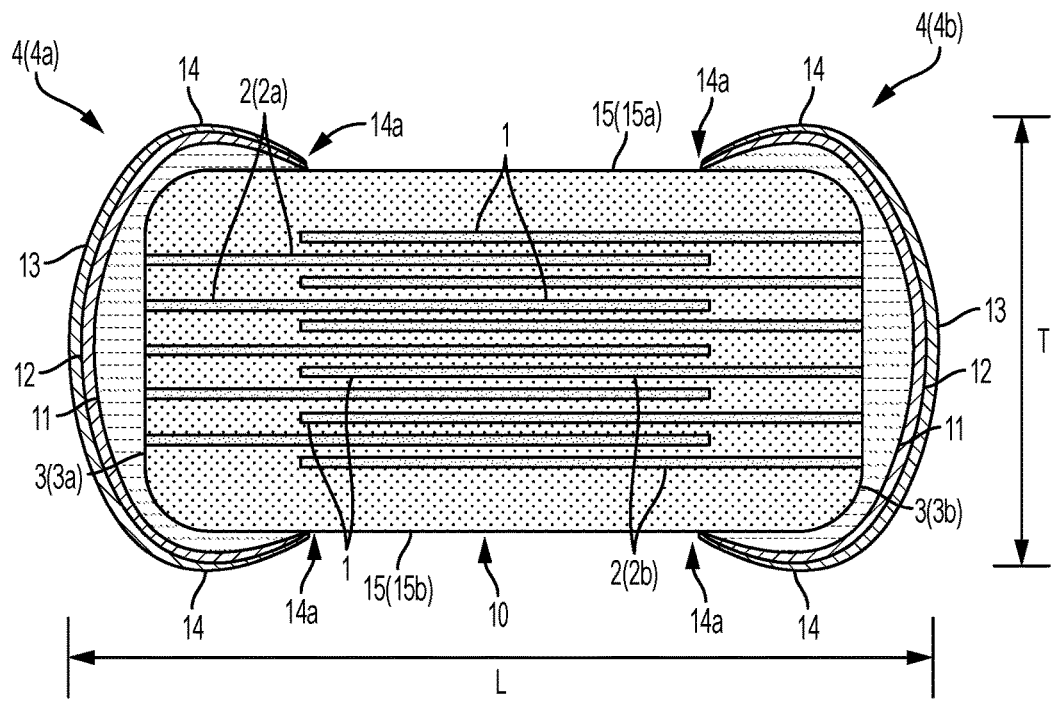
FIG. 2. is a front cross-sectional view showing the structure of a multilayer ceramic capacitor according to the embodiment of FIG. 1.

Referring now to the drawings wherein like numerals indicate like elements, FIGS. 1 and 2 show a multilayer ceramic capacitor including a ceramic body (multilayer ceramic capacitor element) 10 in which a plurality of internal electrodes 2 (2a, 2b) are stacked in layers with a ceramic layer 1 as a dielectric layer interposed therebetween, and external electrodes 4 (4a, 4b) arranged on opposite end surfaces 3 (3a, 3b) of ceramic body 10 and electrically connected to internal electrodes 2 (2a, 2b). The external electrodes 4 (4a, 4b) cover the opposite end surfaces 3 (3a, 3b) of ceramic body 10 and extend beyond the edges of the end surfaces 3 onto the four side surfaces 15 of the ceramic body 10.

Each of external electrodes 4 (4a, 4b) has a multilayer structure including an external electrode main body (baked Cu electrode) 11 formed by baking a conductive paste containing a Cu powder as a conductive component; a Ni-plating film layer 12 formed over a surface of external electrode main body 11; and a Sn-plating film layer 13 formed over a surface of Ni-plating film layer 12.

Ceramic layers 1 forming ceramic body 10 are preferably formed of a dielectric ceramic having a perovskite structure (in this embodiment, a BaTiO3-based ceramic), and internal electrodes 2 (2a, 2b) are preferably formed of a base-metal electrode containing Ni as a conductive component.

A method for manufacturing this multilayer ceramic electronic component (multilayer ceramic capacitor) will now be described.

[1] Preparation of Ceramic Body (1) A ceramic slurry is prepared by mixing a perovskite-type compound containing Ba and Ti as main components (BaTiO3-based ceramic powder) with predetermined proportions of an organic binder, an organic solvent, a plasticizer, and a dispersant.

The resulting ceramic slurry is applied onto a resin film to give a thickness after drying of 4.0 μm, thus preparing a ceramic green sheet.

(2) A conductive paste for forming the internal electrodes (internal electrode paste) is prepared by blending 50 wt parts of a Ni powder with an average particle size of 0.3 μm and 45 wt parts of a resin solution in which 10 wt parts of ethylcellulose is dissolved in butyl carbitol, as well as a dispersant and a thickener as the remaining parts.

As the conductive component forming the internal electrode paste, a powder of a base metal other than the Ni powder can be suitably used, for example, a Ni alloy, Cu, a Cu alloy, or the like. In some cases, a powder of a noble metal such as Ag or the like can also be used.

(3) The ceramic green sheet prepared in step (1) above is fired, and then a predetermined number of the fired ceramic green sheets are stacked to form an outer layer portion having a predetermined thickness, thus forming a lower outer layer portion.

(4) A ceramic green sheet having an electrode pattern formed thereon is formed by applying the conductive paste (internal electrode paste) containing Ni as a conductive component prepared in step (2) above to the ceramic green sheet used in step (1) above preferably by screen printing, in a pattern corresponding to a size after firing of the ceramic element (3.2 mm (length)×1.6 mm (width)), to give a thickness after drying of 2 μm, and a predetermined number (350 in this embodiment) of the ceramic green sheets having an electrode pattern formed thereon are stacked onto the lower outer layer portion formed in step (3) above.

(5) A predetermined number of the ceramic green sheets prepared in step (1) above are stacked onto the ceramic green sheets having an electrode pattern formed thereon stacked in step (4) above to form an outer layer portion with a predetermined thickness after firing, to form an upper outer layer portion. In this way, an unfired stacked block is formed.

(6) The unfired stacked block prepared in step (5) above is cut at a predetermined position, thus obtaining an unfired ceramic body.

(7) The unfired ceramic body obtained in step (6) above is subjected to a degreasing treatment using a batch furnace in a nitrogen atmosphere under the conditions of 400° C. and 10 hours, and then fired in a mixed atmosphere of nitrogen-hydrogen-steam under the conditions of a top temperature of 1200° C. and an oxygen partial pressure of 10-9 to 10-10 MPa, thus obtaining a fired ceramic body before formation of the external electrodes.

In this embodiment, the ceramic body preferably has a rectangular parallelepiped shape having a length L (measured along the Y axis in FIG. 1) of 3.2 mm, a width W (measured along the X axis in FIG. 1) of 1.6 mm, and thickness T (measured along the Z axis of FIG. 1) of 1.6 mm.

[2] Formation of External Electrodes (1) Preparation of Conductive Paste for Forming External Electrodes As a conductive paste for use in forming the external electrodes, an external electrode paste is prepared containing 70 to 75 wt parts of a Cu powder, 5 to 10 wt parts of borosilicate-based glass frit with a $SiO_2$ content of 43 wt %, and 20 wt parts of a resin solution in which 20 wt % of ethylcellulose is dissolved in butyl carbitol.

(2) Application of Conductive Paste for Forming External Electrodes

The conductive paste for forming the external electrodes prepared as above is applied to opposite end surfaces 3a, 3b of the fired ceramic body, using a dip coating method. For example, the conductive paste for forming the external electrodes is applied to a prescribed thickness to a flat plate, and one end surface (e.g., end surface 4a) of the ceramic body held from above with a holding jig is dipped, so as to apply the external electrode paste to the end surface and regions extending around from the end surface to side surfaces 15 of the ceramic body.

Then, after the applied conductive paste is dried, the other end surface (e.g., end surface 4b) of the ceramic body is dipped in a similar manner, to apply the conductive paste to the other end surface and regions extending around from the end surface to side surfaces 15 of the ceramic body, followed by drying.

(3) To fire the conductive paste for forming the external electrodes applied to the ceramic body, the ceramic body is heat treated using a belt furnace.

The heat treatment is performed in a mixed atmosphere of nitrogen-air-steam or a mixed atmosphere of nitrogen-hydrogen-steam, under the conditions of a top temperature of 790 to 880° C. and an oxygen electromotive force of 220 to 280 mV at the top temperature. This results in the formation of baked Cu electrodes (external electrode main bodies) on the opposite ends of the ceramic body.

(4) Plating

Each of the formed external electrodes is Ni-plated using a wet electroplating method to form a Ni-plating film over the surface of the external electrode, and is further Sn-plated using the wet electroplating method to form a Sn-plating film over the Ni-plating film.

This results in a multilayer ceramic capacitor with the structure as shown in FIGS. 1 and 2.

[3] Evaluation

Figure 3:
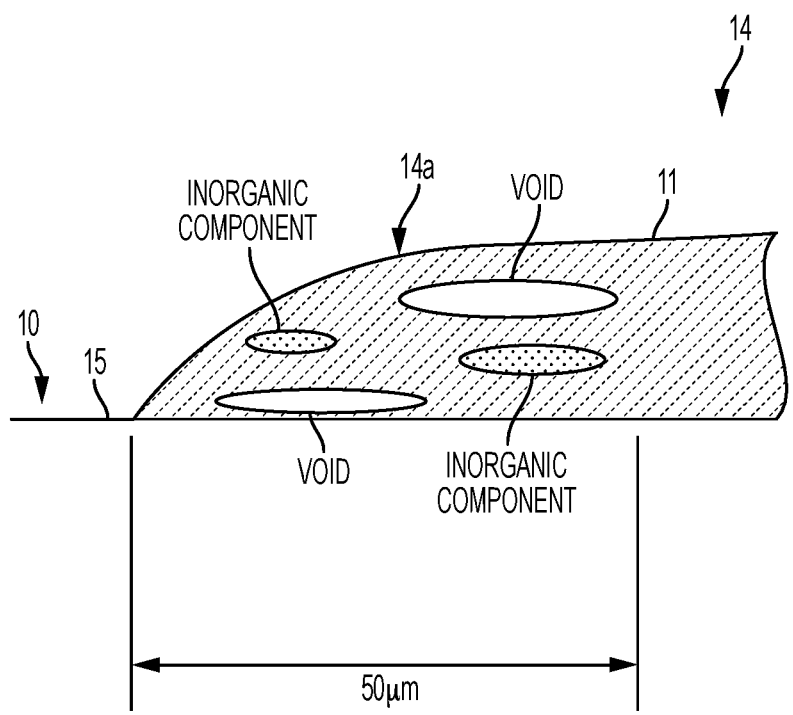
FIG. 3 is a schematic diagram showing the presence of a conductive component (Cu), an inorganic component, and voids in an edge region of an extending-around portion of an external electrode of the multilayer ceramic capacitor shown in FIG. 1.
Figure 4:
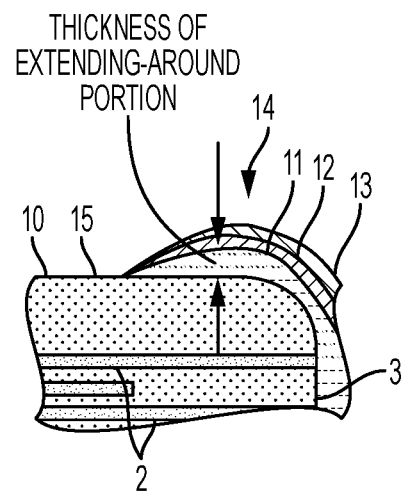
FIG. 4 is a schematic diagram showing a thickness of the extending-around portion of the external electrode (external electrode main body) extending around to a side surface of a ceramic body of the multilayer ceramic capacitor shown in FIG. 1.
Figure 5:
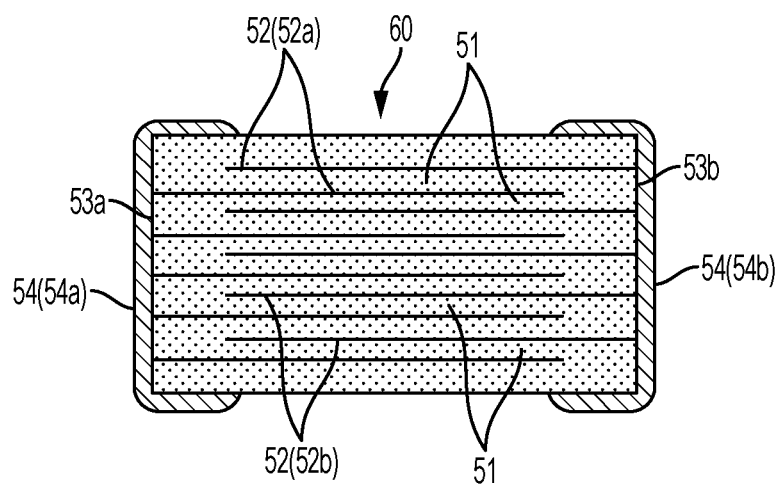
FIG. 5 is a diagram showing one example of a conventional multilayer ceramic electronic component.

The multilayer ceramic capacitor prepared as above was evaluated for its characteristics, by performing the following measurements or test using the methods described below:

(a) measurement of an occupancy area ratio of the conductive component and the inorganic component in an edge region 14a (see FIGS. 2 and 3) of an extending-around portion 14 of the external electrode 4;

(b) measurement of the thickness of extending-around portion 14 (see FIG. 3);

(c) a bending test; and (d) measurement of adhesion of the soldered external electrodes.

(a) Measurement of the Occupancy Area Ratio

An edge region 14a of the external electrode 11 (i.e., the region of the extending-around portion 14 extending 50 μm from the leading edge 5 of the external electrode toward the edge where the side surface of the ceramic body 10 meets the end surface of the ceramic body 10) was examined to determine its occupancy area ratio. As used herein the occupancy ratio is defined by the following equation:

occupancy area ratio(%)={(the area of the conductive component+the area of the inorganic component)/(the area of the conductive component+the area of the inorganic component+the area of the voids)}×100    (Equation 1)

Figure 6A:
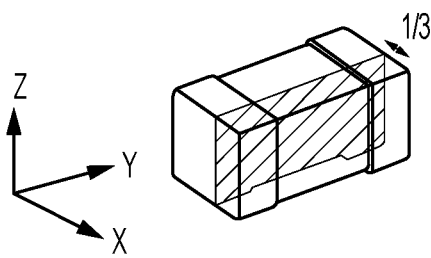
FIGS. 6A, 6B and 6C are perspective views showing three cross sections of the multilayer ceramic capacitor shown in FIG. 1.
Figure 6B:
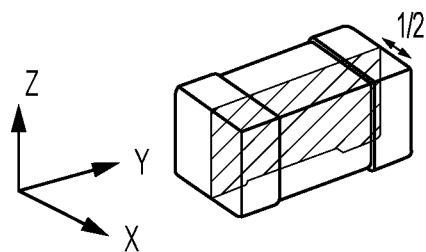
Figure 6C:
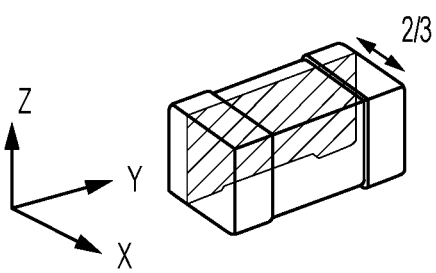

Since the occupancy area ratio will vary depending on where it is measured, the invention takes measurements at three cross sections of the edge region 14a and averages those measurements to arrive at an average occupancy area ratio. The three cross sections of the multilayer ceramic capacitor are shown in FIGS. 6A, 6B and 6C. The first cross section, shown in FIG. 6A, was formed by grinding the ceramic capacitor along the Y-Z plane to a depth of ⅓ the width W of the capacitor. The second cross section, shown in FIG. 6B, was formed by further grinding the ceramic capacitor along the Y-Z plane to a depth of ½ the width W of the capacitor. The third cross section, shown in FIG. 6C, was formed by yet further grinding the ceramic capacitor along the Y-Z plane to a depth of ⅔ the width W of the capacitor. Each of the grinding steps was carried out using a focused ion beam (FIB) machining.

The occupancy area ratio of the edge region 14a was observed for each of the three cross sections and an average occupancy area ratio was determined as follows.

Five images of the edge region 14a of each of the cross sections were obtained using a scanning ion microscopic (SIM) so that 15 images were obtained. When the external electrode paste was present in the form of islands, rather than being connected to the external electrode main body, it was not included as part of the edge region.

The so obtained SIM images were subjected to image processing, and then the area of the conductive component (Cu), the area of the inorganic component, and the area of voids were calculated for each image.

FIG. 3 is a schematic diagram showing the presence of the conductive component (Cu), the inorganic component, and voids, in edge region 14a. To calculate the area of the conductive component (Cu), the area of the inorganic component, and the area of the voids, the respective sections of the conductive component (Cu), the inorganic component, the voids, and the ceramic were determined from a channeling contrast (image processing) of the SIM images. Specifically, binarization was performed on each image and the areas were calculated by counting the number of pixels having a contrast equal to or lower than a predetermined value.

The occupancy area ratio of the conductive component and the inorganic component for each cross section was then determined in accordance with equation (1) above. The resulting occupancy area ratios were averaged to arrive at a final occupancy area ratio.

Table 1, below, shows average values each determined from a plurality of calculated values of the occupancy area ratio of the conductive component and the inorganic component.

Then, the multilayer ceramic capacitor was ground along the Y-Z plane to a depth of ½ the dimension in the X direction was reached. The cross section was then examined for the presence or absence of a crack. A crack formation ratio was then calculated (n=20) in accordance with the following equation (2):

$$\text{crack formation ratio}(\%) = \{\text{the number of samples in which a crack formed/the number of tested samples}(20)\} \times 100 \quad \text{[Equation 2]}$$

(d) Measurement of Adhesion of Soldered External Electrodes

The external electrodes of the multilayer ceramic capacitor were fixed with solder to a headspin, and then subjected to a tensile test on a tensile testing machine at a tensile speed of 0.5 mm/s. A breaking stress at which the external electrodes were detached was measured as the adhesion (the number of samples n=10).

Each of the values of adhesion (N) shown in Table 1 represents an average value of values of adhesion measured for 20 samples.

TABLE 1

| Sample No. | Conductive Paste Composition | | Baking Top Temperature (° C.) | Oxygen Electromotive Force (mV) at Top Temperature | Occupancy Area Ratio (%) of Conductive Component and Inorganic Component | Thickness (μm) of Extending-around portion of External Electrode | Crack Formation Ratio (%) When Held at 2 mm in Bending Test | Crack Formation Ratio (%) When Held at 2.5 mm in Bending Test | Adhesion (N) | Determination |
|---|---|---|---|---|---|---|---|---|---|---|
| | Cu Powder (wt part) | Borosilicate-Based Glass Frit (wt part) | | | | | | | | |
| *1 | 70 | 10 | 880 | 280 | 90 | 35 | 15 | 60 | 17 | X |
| *2 | 70 | 10 | 830 | 260 | 80 | 30 | 5 | 30 | 15 | X |
| *3 | 72 | 8 | 880 | 280 | 83 | 25 | 10 | 40 | 16 | X |
| 4 | 70 | 10 | 790 | 220 | 75 | 35 | 0 | 15 | 16 | ○ |
| 5 | 75 | 5 | 790 | 220 | 25 | 35 | 0 | 5 | 15 | ○ |
| 6 | 73 | 7 | 810 | 240 | 66 | 25 | 0 | 10 | 15 | ○ |
| 7 | 74 | 6 | 805 | 235 | 42 | 25 | 0 | 10 | 15 | ○ |
| 8 | 72 | 8 | 860 | 265 | 75 | 10 | 0 | 0 | 16 | ○○ |
| 9 | 72 | 8 | 870 | 270 | 62 | 5 | 0 | 0 | 15 | ○○ |
| *10 | 72 | 8 | 810 | 240 | 15 | 10 | — | — | 12 | X |
| *11 | 73 | 7 | 860 | 265 | 18 | 3 | — | — | 12 | X |

(b) Measurement of Thickness of the Extending-Around Portion

For each of the cross sections, a maximum thickness of the extending-around portion 14 was measured with a metallographic microscope. Five measurements of each of the cross sections were taken so that 15 measurements were obtained.

FIG. 3 is a schematic diagram showing the thickness of extending-around portion 14. Note that the thickness of the plating films is excluded in the measurement of the thickness of extending-around portion 14 of external electrode 4.

Furthermore, each of the values of the thickness of the extending-around portion of the external electrode shown in Table 1 represents an average value of measured thicknesses of the extending-around portion.

(c) Bending Test

The multilayer ceramic capacitor was soldered onto a glass epoxy substrate, and a load was applied from above to a central portion of the ceramic body of the multilayer ceramic capacitor at a rate of 1.0 mm/s, and then the multilayer ceramic capacitor was held for a period of 5±1 s from the point in time when a bending amount of 2.0 mm or a bending amount of 2.5 mm was reached.

In Table 1, starred samples are comparative examples not meeting the requirements of the present invention. Sample Nos. 1-3 have an occupancy area ratio of over 75%. Sample Nos. 10 and 11 have an occupancy area ratio of below 25%. Sample Nos. 4 to 9 have an occupancy area ratio between 25 to 75% and therefore meet the requirements of the present invention. In Sample Nos. 8 and 9 the thickness of the extending-around portion is from 5 to 10 μm.

<Evaluation>

Of the samples according to Sample Nos. 1 to 11 shown in Table 1, for those samples not meeting the requirements of the present invention (samples according to Sample Nos. 1 to 3), in which the occupancy area ratio of the conductive component and the inorganic component was over 75%, and the thickness of the extending-around portion was from 25 to 35 μm, the crack formation ratio in the bending test was high, though the soldering adhesion was ensured. Thus, these samples were confirmed to be undesirable.

In Sample Nos. 10 and 11 in which the occupancy area ratio of the conductive component and the inorganic component was below 25%, and the thickness of the extending-around portion 14 was 10 μm and 3 μm, respectively, the soldering adhesion was poor, and thus, these samples were also confirmed to be undesirable.

Note that in the samples according to Sample Nos. 10 and 11, although the thickness of the extending-around portion of the external electrode extending around to the side surface of the ceramic body was 10 μm and 3 μm, respectively, the occupancy area ratio of the conductive component and the inorganic component was below 25%, and thus, no effect of improving the strength was observed.

In contrast, in sample Nos. 4 to 9 having an occupancy area ratio from 25 to 75% no cracks were observed when the amount of bending was 2.0 mm. Furthermore, for samples according to Sample Nos. 8 and 9, in which the thickness of the extending-around portion of the external electrode extending around to the side surface of the ceramic body was 10 μm and 5 μm, respectively, formation of cracks was not observed even when the amount of bending was 2.5 mm.

The reasons for the foregoing results are believed to be as follows. When the occupancy area ratio of the conductive component and the inorganic component is from 25 to 75%, the stress caused by the conductive component, Cu, of the external electrode is reduced, and an effect of improving the strength is achieved. Furthermore, when the thickness of the extending-around portion 14 is from 5 to 10 μm, the stress caused by the external electrode is further reduced, leading to a further enhanced effect of improving the strength.

For the samples according to Sample Nos. 3 to 7, however, in which the thickness of the extending-around portion 14 was over 10 μm, and from 25 to 35 μm, cracks were confirmed to be formed at a ratio from 5 to 15% when the amount of bending was 2.5 mm. A reason for this is believed to be as follows. Even though the occupancy area ratio of the conductive component and the inorganic component is from 25 to 75%, if the thickness of the extending-around portion of the external electrode extending around to the side surface of the ceramic body is over 10 μm, and more particularly from 25 to 35 μm, the stress caused by the external electrode increased to some extent, leading to a decreased effect of improving the strength.

While the multilayer ceramic capacitor has been described by way of example in the foregoing embodiments, the present invention can be applied not only to the multilayer ceramic capacitor, but also to any of various multilayer ceramic electronic components, such as, for example, a multilayer-type LC composite part, a multilayer varistor, or the like, including electrodes inside a ceramic body (internal electrodes), and including external electrodes each extending around from an end surface of the ceramic body to a side surface thereof.

Furthermore, the present invention is in no way limited to the foregoing embodiments in other respects, and various applications and modifications within the scope of the invention can be added to the invention.

The invention claimed is:

1. A multilayer ceramic electronic component comprising:
a ceramic body having an end surface and a side surface adjacent to thereto, the end surface and the side surface meeting at an edge, the ceramic body having a plurality of internal electrodes, adjacent pairs of internal electrodes being separated by a respective ceramic layer; and
an external electrode containing a metal as a conductive component, an inorganic component and voids, the external electrode being electrically connected to at least some of the internal electrodes, covering the end surface and extending over the edge onto the side surface to form an extending-around portion which extends at least 50 μm onto the side surface as measured in a direction perpendicular to the edge and ends at a leading edge remote from the edge, a portion of the extending-around area which extends 50 μm from the leading edge towards the edge having an average occupancy area ratio of the conductive component and the inorganic component which is at least 25 but not greater than 62.

2. The multilayer ceramic electronic component according to claim 1, wherein the thickness of the extending-around portion is 5 to 10 μm as measured in a direction parallel to the end surface.

3. The multilayer ceramic electronic component according to claim 1, wherein the conductive component forming the external electrode contains Cu as a main component.

4. The multilayer ceramic electronic component according to claim 3, wherein the inorganic component forming the external electrode contains Si.

5. The multilayer ceramic electronic component according to claim 1, wherein the inorganic component forming the external electrode contains Si.

* * * * *